United States Patent [19]

Kaminsky

[11] 4,431,788
[45] Feb. 14, 1984

[54] PROCESS FOR PRODUCING STARCH/POLYOLEFIN POLYMER COMPOSITIONS

[75] Inventor: Walter Kaminsky, Pinneberg-Waldenau, Fed. Rep. of Germany

[73] Assignee: CPC International Inc., Englewood Cliffs, N.J.

[21] Appl. No.: 440,789

[22] Filed: Nov. 12, 1982

Related U.S. Application Data

[63] Continuation of Ser. No. 234,291, Feb. 17, 1981, abandoned.

[30] Foreign Application Priority Data

Feb. 28, 1980 [DE] Fed. Rep. of Germany ....... 3007433

[51] Int. Cl.$^3$ .......................... C08K 5/16; C08F 10/00
[52] U.S. Cl. ...................................... 527/313; 524/734
[58] Field of Search ........................ 527/313; 526/142; 524/734

[56] References Cited

U.S. PATENT DOCUMENTS 3,704,271 11/1972 Prahl et al. .......................... 524/734

FOREIGN PATENT DOCUMENTS 747817 12/1966 Canada ................................ 524/142
3007433 9/1981 Fed. Rep. of Germany ...... 524/734

OTHER PUBLICATIONS

Chem. Abstract, 85:178,042.

Primary Examiner—Theodore Morris

[57] ABSTRACT

A process is disclosed for producing starch/polyolefin polymer compositions by polymerization of at least one olefin in the presence of a Ziegler-Natta catalyst. The Ziegler-Natta catalyst used is obtained by contacting dried starch with an aluminum trialkyl followed by introducing a transition metal compound of the formula $$(\text{cyclopentadienyl})_n \, MR_m$$

wherein M is selected from the group consisting of Cr, Ti, V or Zr, R is a lower hydrocarbon radical or acetyl acetonate, and n and m are integers from 0 to 4 and n+m equals 2 to 4.

24 Claims, No Drawings

PROCESS FOR PRODUCING STARCH/POLYOLEFIN POLYMER COMPOSITIONS

This is a continuation, of application Ser. No. 234,291 filed Feb. 17, 1981 now abandoned.

BACKGROUND OF THE INVENTION

1. Field of the Invention

This invention relates to a process for producing starch/polyolefin polymer compositions by polymerization of at least one olefin, preferably an aliphatic, low-molecular weight alpha-monoolefin, in an inert, liquid or gaseous or liquid and gaseous reaction medium at a temperature from −50° to 145° C. in the presence of a Ziegler-Natta catalyst obtained by treating dried starch with an aluminum trialkyl and a transition metal compound.

2. The Prior Art

Processes of this type are generally known, as disclosed in U.S. Pat. No. 3,704,271, and are aimed chiefly at producing polymer compositions with specific advantageous functional properties which are not obtained when the relevant mixtures are produced by physical methods. Such processes are also aimed at producing polyolefins of desired morphological properties. These are derived from said polymer compositions by at least partial separation of the starch. Polyolefins of this kind are designated in the literature as "nascent polyolefins."

Although the known processes, in principle, accomplish this object, they have not gained any practical importance. The reasons are essentially as follows.

The prior art almost exclusively recommends the use of Ziegler-Natta catalysts with transition metal halides, especially vanadium and titanium chlorides, as the transition metal compound. These are known to be highly corrosive and require the use of rather expensive non-corroding equipment.

Another disadvantage of the prior art is that the catalysts which are applied to starch frequently show a much lower activity and productivity than the Ziegler-Natta catalysts used in classical olefin polymerization. This requires the use of extremely large amounts of catalyst in industrial processes, causing catalyst cost to increase to an intolerably high level and raising the content of transition metal(s) in the crude products to a point where the polymer compositions either are no longer fit for quite a number of applications or require previous separation of transition metal(s) in a complicated and costly process.

It is therefore an object of this invention to improve the known processes of the type described above in such a way that the disadvantages involved in the state of the art are avoided or at least mitigated and especially to provide a process which can be carried out using equipment which does not require any special protection from corrosion and needs only comparatively small amounts of catalysts.

SUMMARY OF THE INVENTION

The present invention relates to starch/polyolefin polymer compositions and a process for producing them. In the process, at least one olefin is polymerized in an inert liquid, gaseous or liquid and gaseous reaction medium. A temperature from −50° to 145° C. is maintained in said reaction medium. A Ziegler-Natta catalyst obtained by treating dried starch with an aluminum trialkyl and a transition metal compound is also provided in said reaction medium.

In preparation of the Ziegler-Natta catalyst, a halogen-free catalyst is used which has been obtained by first treating the starch with the aluminum trialkyl. This is followed by treatment with a transition metal compound of the general formula:

$$(\text{cyclopentadienyl})_n MR_m \qquad \qquad \text{I}$$

wherein
- M is selected from the group consisting of Cr, Ti, V, or Zr;
- R is a lower hydrocarbon radical having from one to about six carbon atoms, or acetyl acetonate; and
- n and m are integers from 0 to 4, and the sum of n+m is sufficient to saturate M.

Starch/polyolefin polymer compositions produced in accordance with the present invention are useful in a variety of applications including use in water-resistant adhesives and binders, paper sizes and coatings, textile sizes, and paint extenders.

DETAILED DESCRIPTION OF THE INVENTION

The present invention is based on the finding that certain known Ziegler-Natta catalysts such as so-called "homogeneous" Ziegler-Natta catalysts even when applied to starch, show a much higher activity and productivity than the catalysts of this type known in the art if, when the catalyst is prepared, the aluminum trialkyl is first reacted with the starch followed by the transition metal compound.

This finding is particularly surprising because in U.S. Pat. No. 3,704,271 the order of addition of the catalyst components is considered to be of no importance. In all of the examples in that patent, in fact, the reverse order of addition is used. Also, because the transition metal compounds of formula I which are used in the invention and are known per se, so far have been employed merely in homogeneous Ziegler-Natta catalyst systems and have been found to show sufficient activity merely in very specific systems precisely adjusted in qualitative and quantitative terms so that their superior activity and productivity in the heterogeneous systems used in the invention was not previously foreseen.

It has also been discovered that unusually high molar ratios of aluminum trialkyl to transition metal compound can surprisingly be employed in the process of the invention with no major drop in catalyst activity being experienced. In this manner the amount of transition metal compound which is both expensive and usually undesired in the end product for a number of reasons can advantageously be further reduced.

In a preferred embodiment of the invention a catalyst with a molar ratio of aluminum trialkyl to transition metal compound of 2:1 to 1000:1, preferably 5:1 to 200:1, and most preferably of 10:1 to 100:1 is therefore used. The high activity and productivity of the catalyst systems used in the invention also permits the amount of aluminum trialkyl to be reduced to a comparatively low level, it being a surprising fact that even comparatively large amounts of residual water in the starch are not disturbing. A preferred embodiment of the invention, therefore, uses a catalyst with a volume ratio of aluminum trialkyl to starch in mmol/g of no more than 5, preferably no more than 3 and most preferably less than 2.

Preferred aluminum trialkyls used in accordance with the present invention have alkyls with from 1 to about 8 carbon atoms. (For example, triethyl, triisopropyl, triisobutyl, etc.)

As regards the transition metal compounds of formula I, certain bis(cyclopentadienyl) chromium, titanium, vanadium, and zirconium alkyls have been found to be particularly suitable for the purpose of the invention. The process of the invention, therefore, preferably uses catalysts which have been prepared from a transition metal compound of the general formula (cyclopentadienyl)$_2$M(CH$_3$)$_2$   II wherein M has the definition as outlined in formula I.

The alpha-monoolefins of the invention preferably consists of C$_2$ to C$_6$ monoolefins, especially ethylene or propene.

Suitable starches for the purposes of the invention are all types of starches as well as chemically and/or physically modified starches and starch degradation products (starch hydrolyzates) including starch saccharification products. Granular cereal starches, especially corn starch, or root or tuber starches, especially potato starch, or modified degraded starches are generally preferred. The terms "modified starch" and "starch degradation products" include, for example, pregelatinized starches (cold swelling starch) acid modified starches, oxidized starches, slightly cross-linked starches, starch ethers and starch esters, dialdehyde starches, and degradation products of starch hydrolyzed products and dextrines. The starches used in accordance with the present invention are generally dried to a moisture content below about 7 percent by weight and preferably have a moisture content of from about 0.1 to about 2 percent by weight.

In an optionally preferred variant of the process of the invention the starch is combined with a fibrous carbohydrate material such as cellulose, which imparts certain properties, especially added strength, to the starch/polyolefin polymer compositions. This material is dried to the same moisture content as the starch.

A preferred embodiment of the invention, therefore, is characterized by the fact that a mixture of starch and up to 99% by weight, preferably about 5 to 80% by weight, cellulose fibers is used as or instead of starch.

It is noted in this context that the starch in the invention may be replaced partly or wholly by lignin. Therefore, a process in which lignin is used in admixture with or in place of starch, and, if desired, also mixed with a fibrous carbohydrate material, is also a subject of this invention. Saw dust is an example of such a mixture.

The amounts of starch and/or lignin as well as fibrous carbohydrate material which may be present are dictated by the end use of the starch/polyolefin polymer compositions. If one wants to produce starch/polyolefin polymer compositions which are made porous by using carbohydrate material, the amount of carbohydrate material will be small; generally up to about 40% by weight. If, however, papers having improved wet strength are to be produced, the amount of carbohydrate material may be about 95%, since only a small amount of polyolefin needs to be polymerized onto a base consisting essentially of carbohydrate fibers. For practical reasons, the amount of carbohydrate material in the starch/polyolefin polymer compositions is rarely less than about 10%.

The starch/polyolefin polymer compositions produced according to the process of the invention are as a rule obtained in the form of free-flowing compositions consisting of polyolefin-coated starch particles which by mechanical treatment like rolling, pressing or extruding, preferably at elevated temperature, may be homogenized and shaped into composite materials showing properties which at least up to now have not been achieved with purely physical mixtures of starches and polyolefins. In spite of the intimate bond between starch and polyolefin obtained in the process of the invention by polymerization in situ, it is possible to separate the starch again wholly or partly from the starch/polyolefin polymer compositions of the invention, if desired for the production of polyolefin materials with advantageous functional properties, e.g., a specific porosity, either mechanically and/or by dissolving it out according to per se known methods. This applies not only to starch/polyolefin polymer compositions as they result from the process of polymerization, but optionally also to products which have been homogenized as described above or have been shaped into, for instance, foils or fibers. A decisive advantage of the process of the invention, therefore, is that it opens up an economical way of producing new polyolefin-based materials which have been "eked out" by polymers supplied by nature every year anew and which, at least with regard to certain uses, show properties equivalent or even superior to those of conventional polyolefins.

The examples below will more clearly illustrate the invention:

EXAMPLE 1

19.6 g starch dried by azeotropic distillation with toluene was added to an autoclave with 20.0 mg aluminum trimethyl in 250 ml toluene at 40° C. After 40 minutes 0.05 mmol bis(cyclopentadienyl) titanium dimethyl was added followed by introduction of ethylene from a steel bomb through a pressure reduction valve. A pressure of 9 bar was maintained throughout the reaction by adjustment of the valve. After a polymerization time of one hour 49.6 g starch/polyolefin polymer compositions was obtained consisting of 19.6 g starch and 30 g polyethylene.

Productivity, therefore, was about 12,526 g polyethylene/g titanium.

For comparison, example 1 of U.S. Pat. No. 3,704,271 was repeated several times and productivity found to be only about 30 to 60 g polyethylene/g titanium.

EXAMPLE 2

21.2 g starch dried as described in Example 1 was added with 20.0 mg aluminum trimethyl in 250 ml toluene at 40° C. After 60 minutes 0.05 mg bis(cyclopentadienyl) titanium dimethyl was added, whereupon ethylene was added under pressure as in Example 1. In this manner 44 g starch/polyolefin polymer composition was obtained consisting of 21.2 g starch and 22.8 g polyethylene. Productivity, therefore, was about 9,519 g polyethylene/g titanium.

EXAMPLE 3

Example 1 was repeated except that tetracyclopentadienyl zirconium was used as the transition metal compound and the polymerization time was 10 hours. 34.9 g starch/polyolefin polymer compositions was obtained consisting of 19.6 g starch and 9.8 g polyethylene. Productivity, therefore, was about 2,149 g polyethylene/g zirconium.

EXAMPLE 4

Example 1 was repeated except that 0.05 mmol vanadyl acetyl acetonate was used as the compound of formula I and that the polymerization time was 21 hours. In this manner 24.8 g starch/polyolefin polymer compositions was obtained consisting of 19.5 g starch and 5.3 g polyethylene. Productivity, therefore, was about 2,081 g polyethylene/g vanadium.

EXAMPLE 5

10 g starch, dried as shown in Example 1, was added at 40° C. with 5.2 mmol aluminum trimethyl in 200 ml toluene. After 120 minutes 0.04 mmol bis (cyclopentadienyl) zirconium dimethyl and 100 ml propene were added followed by introduction of ethylene from a steel bomb through a pressure reduction valve. A pressure of 9 bar was maintained throughout the reaction by adjustment of the valve. After a polymerization time of 5 hours 21.5 g polymer composition was obtained consisting of 10 g starch and 11.5 g ethylene-propene copolymer. Productivity, therefore was about 3,152 g ethylene-propane copolymer/g zirconium.

EXAMPLE 6

Example 1 was repeated except that 10 g dried lignin in 200 ml heptane was used instead of starch and toluene. The polymerization time was 10 hours. 22.4 g lignin-polyethylene-polymer composition was obtained consisting of 10 g lignin and 12.4 g polyethylene. Productivity, therefore, was about 5,177 g polyethylene/g titanium.

Having set forth the general nature and some examples of the present invention, the scope is now particularly set forth in the appended claims.

I claim:

1. A process for producing starch/polyolefin polymer compositions by polymerization of at least one olefin in an inert, liquid or gaseous reaction medium at a temperature from −50° C. to 145° C. in the presence of a halogen-free Ziegler-Natta catalyst by
   (a) contacting starch first with an aluminum trialkyl compound; and then with a halogen-free transition metal compound of the general formula (cyclopentadienyl)$_n$MR$_m$ wherein M is a metal selected from the group consisting of Cr, Ti, V or Zr; R is a lower hydrocarbon radical having from 1 to 6 carbon atoms or acetyl acetonate; and n and m are integers from 0 to 4 and the sum of n+m is sufficient to saturate M, wherein the molar ratio of said aluminum trialkyl compound to said halogen-free transition metal compound is from 2:1 to 1000:1; followed by
   (b) contacting said at least one olefin with the mixture of step (a).

2. The process of claim 1 wherein said halogen-free Ziegler-Natta catalyst has a molar ratio of aluminum trialkyl compound to halogen-free transition metal compound of from 10:1 to 100:1.

3. The process of claim 1, wherein said halogen-free catalyst has a ratio of aluminum trialkyl to starch in mmol/g of no more than 5.

4. The process of claim 1 wherein the transition metal compound has the formula (cyclopentadienyl)$_2$M(CH$_3$)$_2$ wherein M is selected from the group consisting of Cr, Ti, V or Zr.

5. The process of claim 1 wherein ethylene, propene, or ethylene and propene are used as the lower aliphatic alpha-monoolefin.

6. The process of claim 1 wherein starch selected from the group consisting of granular cereal starch, root starch, tuber starch or a modified starch is used as the starch.

7. The process of claim 1 wherein a mixture of granular starch and up to 99% by weight cellulose fibers is used as the starch.

8. The process of claim 1 wherein a mixture of granular starch and lignin is used as the starch.

9. The process of claim 1 wherein a mixture of granular starch, cellulose fibers and lignin is used as the starch.

10. The process of claim 1 wherein the product of polymerization is homogenized after separation of liquid reaction medium at a temperature from 30° to 145° C., under the action of kneading or shearing forces.

11. The process of claim 1 wherein the starch is separated from the starch, polyolefin polymer compositions mechanically.

12. The process of claim 1 wherein the starch is separated from the starch/polyolefin polymer compositions by dissolving.

13. The process of claim 1 wherein the olefin is a lower aliphatic alpha-monoolefin.

14. The process of claim 2 wherein the olefin is a lower aliphatic alpha-monoolefin.

15. The process of claim 14 wherein ethylene, propene, or ethylene and propene are used as the lower aliphatic alpha-monoolefin.

16. The process of claim 2, wherein saaid halogen-free catalyst has a ratio of aluminum trialkyl to starch in mmol/g of no more than 5.

17. The process of claim 2 wherein the transition metal compound has the formula (cyclopentadienyl)$_2$M(CH$_3$)$_2$ wherein M is selected from the group consisting of Cr, Ti, V or Zr.

18. The process of claim 2 wherein starch selected from the group consisting of granular cereal starch, root starch, tuber starch or a modified starch is used as the starch.

19. The process of claim 2 wherein a mixture of granular starch and up to 99% by weight cellulose fibers is used as the starch.

20. The process of claim 2 wherein a mixture of granular starch and lignin is used as the starch.

21. The process of claim 2 wherein a mixture of granular starch, cellulose fibers and lignin is used as the starch.

22. The process of claim 2 wherein the product of polymerization is homogenized after separation of liquid reaction medium at a temperature from 30° to 145° C., under the action of kneading or shearing forces.

23. The process of claim 2 wherein the starch is separated from the starch/polyolefin polymer compositions mechanically.

24. The process of claim 2 wherein the starch is separated from the starch/polyolefin polymer compositions by dissolving.

* * * * *